United States Patent
Saleh et al.

(10) Patent No.: US 10,723,317 B2
(45) Date of Patent: Jul. 28, 2020

(54) VEHICLE PASSIVE ENTRY PROTOCOL WITH ULTRA WIDE BAND RANGING

(71) Applicants: Ahmad N Saleh, Rochester Hills, MI (US); Donald W Grimaudo, Rochester Hills, MI (US)

(72) Inventors: Ahmad N Saleh, Rochester Hills, MI (US); Donald W Grimaudo, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/225,840

(22) Filed: Dec. 19, 2018

(65) Prior Publication Data

US 2020/0198580 A1    Jun. 25, 2020

(51) Int. Cl.
*B60R 25/24*    (2013.01)

(52) U.S. Cl.
CPC .......... *B60R 25/246* (2013.01); *B60R 25/241* (2013.01); *B60R 2325/108* (2013.01)

(58) Field of Classification Search
CPC ......... B60R 25/01; B60R 25/24; B60R 25/30; B60R 25/241; B60R 25/246; B60R 2325/108; G07C 9/00; G07C 9/00111; G07C 9/00309; H02J 7/0047; H04W 4/023; H04W 4/029; H04W 4/046
USPC ...................................................... 340/5.61
See application file for complete search history.

(56) References Cited

U.S. PATENT DOCUMENTS

| 9,571,985 B2* | 2/2017 | Bottazzi .................. G01S 1/042 |
| 2005/0058092 A1* | 3/2005 | Suzuki ................. H04B 1/7163 370/320 |
| 2008/0231498 A1* | 9/2008 | Menzer ................. G01S 13/765 342/134 |
| 2013/0046420 A1* | 2/2013 | Gottifredi ............. G01S 5/0289 701/2 |
| 2013/0214900 A1 | 8/2013 | Mitchell et al. |
| 2014/0253287 A1 | 9/2014 | Bauman et al. |
| 2014/0285319 A1 | 9/2014 | Khan et al. |
| 2014/0308971 A1 | 10/2014 | O'Brien et al. |
| 2015/0197223 A1* | 7/2015 | Almstaetter ............ B60T 13/66 701/70 |
| 2015/0258962 A1 | 9/2015 | Khanu |
| 2015/0291126 A1 | 10/2015 | Nicholls et al. |
| 2016/0332598 A1 | 11/2016 | Ghabra et al. |

(Continued)

*Primary Examiner* — Stephen R Burgdorf
(74) *Attorney, Agent, or Firm* — Ralph E Smith

(57) ABSTRACT

A passive entry system for a vehicle includes a portable fob and a communication and control unit disposed on the vehicle, the communication and control unit configured to control a function of the vehicle. The portable fob and the communication and control unit are configured to communicate ultra-wideband (UWB) signals therebetween. When the function of the vehicle is triggered, the communication and control unit initiates a double-sided UWB ranging session with the portable fob where (i) the portable fob determines a first distance between the portable fob and the communication and control unit, and (ii) the communication and control unit determines a second distance between the portable fob and the communication and control unit. The communication and control unit is configured to prevent control of the function of the vehicle if a final distance, determined from the first and second distances, is greater than the predetermined distance.

20 Claims, 6 Drawing Sheets

(56) References Cited

U.S. PATENT DOCUMENTS

| | | | |
|---|---|---|---|
| 2017/0059701 A1* | 3/2017 | Oh | G01S 13/765 |
| 2017/0063477 A1* | 3/2017 | Reisinger | H04B 17/30 |
| 2018/0007507 A1* | 1/2018 | Ghabra | H04B 1/3822 |
| 2018/0059235 A1 | 3/2018 | McLaughlin et al. | |
| 2018/0099643 A1* | 4/2018 | Golsch | B60R 25/245 |
| 2019/0066422 A1* | 2/2019 | Breer | B60R 25/24 |
| 2019/0135229 A1* | 5/2019 | Ledvina | H04W 12/003 |
| 2019/0263358 A1* | 8/2019 | Kusumoto | B60R 25/246 |

* cited by examiner

VEHICLE PASSIVE ENTRY PROTOCOL WITH ULTRA WIDE BAND RANGING

FIELD

The present application relates generally to vehicle passive entry systems and, more particularly, to relay attack prevention for vehicle passive entry systems.

BACKGROUND

Many vehicles include passive entry systems that allow a user to enter and start the vehicle without a key, simply requiring the driver to carry a key fob. The systems are referred to as 'passive' because they do not require any action from the user. Conventional systems utilize a low frequency radio frequency identification (LF RFID) tag that provides short range communication, and an ultra-high frequency (UHF) transceiver for longer range communication. However, the security of such systems can possibly be circumvented through a "relay attack" that enables an attacker to open or even start the vehicle without the key fob.

In general, a "relay attack" extends the range of the radio frequency transmitter (the key fob) and intercepts the data being transmitted between the key fob and the vehicle. During the relay attack, the LF signal from the vehicle is relayed over a purpose-built RF link composed of an emitter and receiver. The emitter captures the LF signal and up-converts it to higher frequency, which is then amplified and transmitted over the air. The receiver receives the signal and down-converts it to obtain the original LF signal. The LF signal is then amplified again and sent to a loop LF antenna, which reproduces the signal that the vehicle emitted. The attacker can then present the relaying antenna in front of the door handle for the key fob to send the open signal, and then bring the antenna inside the vehicle to send a vehicle start message and start the vehicle. While current systems do work well for their intended purpose, there remains a need for improvement in the relevant art.

SUMMARY

In one example aspect of the invention, a passive entry system for a vehicle is provided. In one example implementation, the system includes a portable fob and a communication and control unit disposed on the vehicle, the communication and control unit configured to control a function of the vehicle. The portable fob and the communication and control unit are configured to communicate ultra-wideband (UWB) signals therebetween, the UWB signals including authentication information to confirm the portable fob is authorized to control a function of the vehicle, and time-of-flight information to confirm the portable fob is within a predetermined distance of the vehicle. When the function of the vehicle is triggered, the communication and control unit initiates a double-sided UWB ranging session with the portable fob where (i) the portable fob determines a first distance between the portable fob and the communication and control unit based on the time-of-flight information in the UWB signals, and (ii) the communication and control unit determines a second distance between the portable fob and the communication and control unit based on the time-of-flight information in the UWB signals. The communication and control unit is configured to prevent control of the function of the vehicle if a final distance, determined from the first and second distances, is greater than the predetermined distance.

In addition to the foregoing, the described system may include one or more of the following: wherein the communication and control unit comprises a radio frequency hub module (RFHM), and a UWB anchor, wherein the first determined distance is a distance between the portable fob and the UWB anchor, and wherein the second determined distance is a distance between the portable fob and the UWB anchor; wherein the UWB anchor is configured to determine the second distance; and wherein a secure connection is not required between the RFHM and the UWB anchor.

In addition to the foregoing, the described system may include one or more of the following: wherein the RFHM is configured to send a low frequency (LF) wakeup signal and an encrypted challenge request to the portable fob when the function of the target device is triggered; wherein the portable fob is configured to send a first UWB signal to the UWB anchor, the first UWB signal including a first UWB challenge and a first timestamp associated therewith; and wherein the UWB anchor is configured to process the first UWB signal and send a second UWB signal to the portable fob, the second UWB signal including a second timestamp associated with when the UWB anchor received the first UWB challenge, a response to the first UWB challenge, and a second UWB challenge along with an associated third timestamp.

In addition to the foregoing, the described system may include one or more of the following: wherein the portable fob is configured to process the second UWB signal and send a third UWB signal to the UWB anchor, the third UWB signal including a fourth timestamp associated with when the portable fob received the second UWB challenge, a response to the second UWB challenge, and a fifth timestamp associated with when the third UWB signal was sent; wherein the UWB anchor is configured to process the third UWB signal and send a fourth UWB signal to the UWB anchor, the fourth UWB signal including the second determined distance; and wherein the RFHM is configured to send a Bluetooth or BLE wakeup signal and an encrypted challenge request to the portable fob when the function of the target device is triggered.

In accordance with another example aspect of the invention, a method of controlling a passive entry system having a portable fob and a communication and control unit, the communication and control unit disposed on a vehicle and configured to control a function of the vehicle is provided. In one example implementation, the method includes communicating ultra-wideband (UWB) signals between the portable fob and the communication and control unit, the UWB signals including authentication information to confirm the portable fob is authorized to control the function of the vehicle, and time-of-flight information to confirm the portable fob is within a predetermined distance of the vehicle. When the function of the vehicle is triggered, initiating a double-sided UWB ranging session with the portable fob where (i) the portable fob determines a first distance between the portable fob and the communication and control unit based on the time-of-flight information in the UWB signals, and (ii) the communication and control unit determines a second distance between the portable fob and the communication and control unit based on the time-of-flight information in the UWB signals. The method further includes preventing control of the function of the vehicle if a final distance, determined from the first and second distances, is greater than the predetermined distance.

In addition to the foregoing, the described method may include one or more of the following: wherein the communication and control unit comprises a radio frequency hub module (RFHM) and a UWB anchor, wherein determining the first distance comprises determining a first distance between the portable fob and the UWB anchor, and wherein determining the second distance comprises determining a second distance between the portable fob and the UWB anchor.

In addition to the foregoing, the described method may include one or more of the following: wherein the UWB anchor determines the second distance; sending, from the RFHM to the portable fob, a low frequency (LF) wakeup signal and an encrypted challenge request when the function of the vehicle is triggered; sending, from the portable fob to the UWB anchor, a first UWB signal that includes a first UWB challenge and a first timestamp associated therewith; and processing, with the UWB anchor, the first UWB signal, and sending a second UWB signal from the UWB anchor to the portable fob, the second UWB signal including a second timestamp associated with when the UWB anchor received the first UWB challenge, a response to the first UWB challenge, and a second UWB challenge along with an associated third timestamp.

In addition to the foregoing, the described method may include one or more of the following: processing, with the portable fob, the second UWB signal, and sending a third UWB signal from the portable fob to the UWB anchor, the third UWB signal including a fourth timestamp associated with when the portable fob received the second UWB challenge, a response to the second UWB challenge, and a fifth timestamp associated with when the third UWB signal was sent; and processing, with the UWB anchor, the third UWB signal, and sending a fourth UWB signal from the UWB anchor to the portable fob, the fourth UWB signal including the second determined distance.

In addition to the foregoing, the described method may include one or more of the following: sending an ultra-high frequency (UHF) signal from the portable fob to the RFHM, the UHF signal including the final distance, and wherein the UHF signal further includes a response to the encrypted challenge request, and wherein the function of the vehicle is one of unlocking the vehicle and starting the vehicle.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is generally directed to systems and methods for preventing relay attacks on vehicle passive entry systems by requiring authentication of a key fob based on distance determinations between the fob and the vehicle. In one example, in addition to low frequency radiofrequency identification (LF RFID) and ultra-high frequency (UHF) transceivers, the systems include ultra-wide band (UWB) with distance bounding protocol as an added layer of security for key fob ranging purposes. The distance bound is obtained from a rapid exchange of messages (e.g., signals) between a verifier and a provider, using a challenge-response authentication. The verifier's challenges are unpredictable to the prover, and the prover's replies are computed as a function of the challenges.

In general, a LF signal is used to activate the key fob, which sends a UWB signal to the vehicle (e.g., UWB anchor). The vehicle and key fob each process the UWB messages to confirm the key fob's distance, and the fob responds with a UHF signal. The vehicle is then unlocked if the fob is determined to belong to the vehicle and is within a predetermined range. A similar process is used to start the vehicle.

Figure 1:
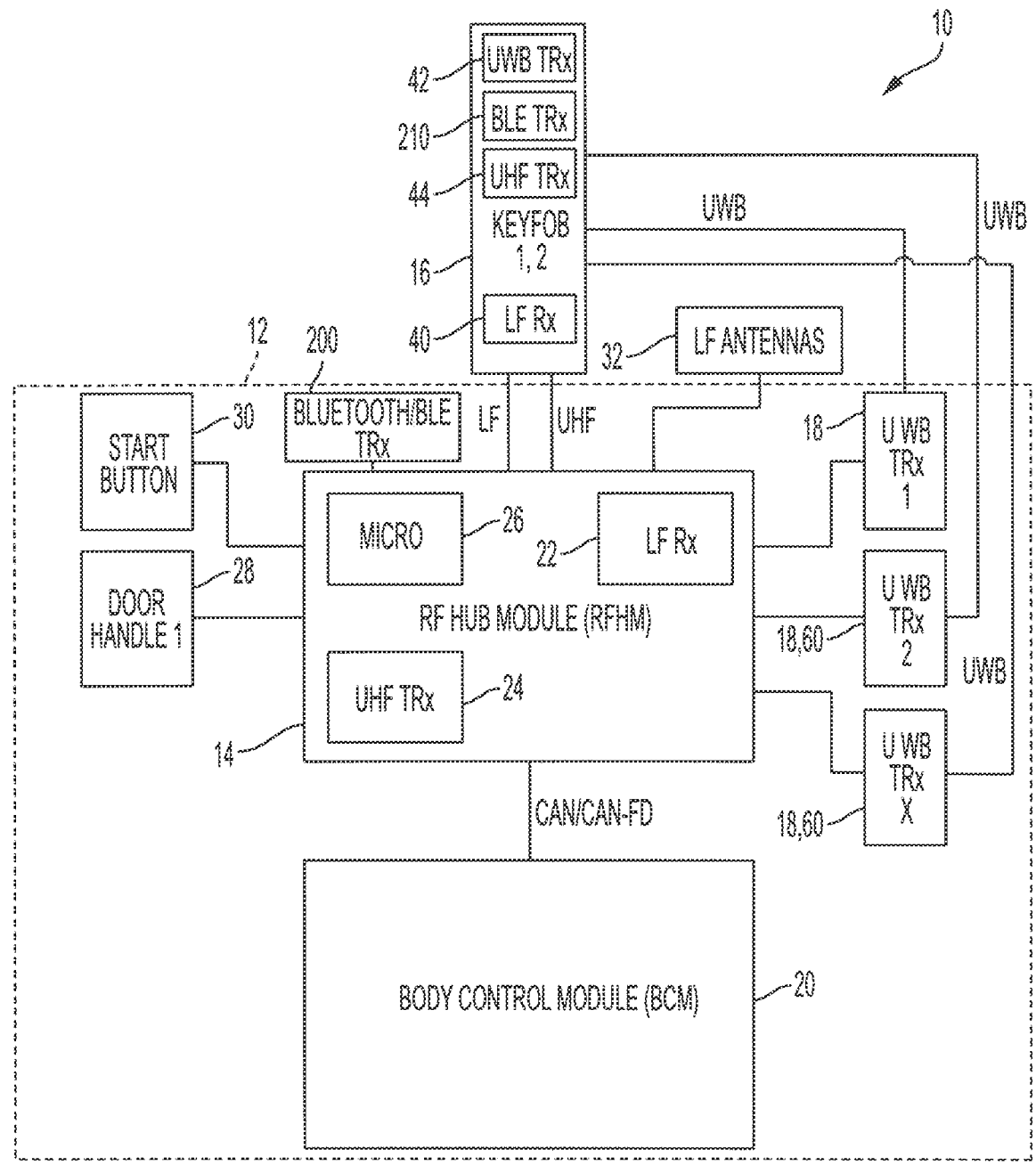
FIG. 1 is a schematic diagram of an example vehicle passive entry system, according to the principles of the present disclosure.

Referring to FIG. 1, an example vehicle passive entry system is generally shown and indicated at reference numeral 10. In the example embodiment, the passive entry system 10 is generally intended for passive entry/start of a vehicle 12 and will be described as such. However, it will be appreciated that passive entry system 10 is not limited thereto and may be utilized with other access targets such as buildings, gates, doors, or other areas or objects where restricted access is desired.

In the example embodiment, passive entry system 10 generally includes a radio frequency hub module (RFHM) 14, a portable fob 16 (e.g., key fob), one or more UWB anchors 18, and a controller 20. The portable fob 16 is configured to communicate with RFHM 14, UWB anchors 18, and controller 20, which together comprise a communication and control unit located at a target device (e.g., vehicle 12). As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

In the illustrated example, RFHM 14 generally includes a LF transmitter 22, a UHF transceiver 24, and a microcontroller 26. The LF transmitter 22 is configured to transmit a LF signal to the fob 16, and UHF transceiver 24 is configured to receive a UHF signal from the fob 16. The microcontroller 26 is in signal communication with an access trigger such as, for example, one or more door handles 28 and a vehicle start button 30. As such, microcontroller 26 is configured to monitor the door handle 28 and start button 30 to detect a user input thereto indicating a request to control a function of the device 26, 28 (e.g, unlock doors or start vehicle). The RFHM 14 includes one or more antennas 32 placed throughout the vehicle.

In the example embodiment, the fob 16 generally includes a LF receiver 40, a UWB transceiver (transmitter/receiver) 42, a UHF transceiver 44, and a processor and memory (not shown) to process the electromagnetic signals. The LF receiver 40 is configured to receive LF signals from RFHM 14, the UWB transceiver 42 is configured to transmit and receive UWB signals, and the UHF transceiver 44 is configured to transmit UHF signals to the RFHM 14.

In the illustrated example, each UWB anchor 18 generally includes a UWB transceiver 60 configured to receive UWB signals from the fob 16 and to transmit UWB signals to the fob 16, as well as a processor and memory (not shown) to enable processing of the UWB signals. In the example embodiment, system 10 includes between two and four anchors 18 distributed throughout vehicle 12 to provide close proximity to an anchor 18 at any location around the vehicle 12. However, it will be appreciated that any suitable number of anchors 18 may be utilized that enables system 10 to function as described herein.

Moreover, some known systems require direct communication between the anchors and the RFHM. In order to be secure, this direct communication must be secured (e.g., encrypted CAN messages, private LIN, etc.). In contrast, the herein described system 10 advantageously utilizes fob 16 to control the communication between the RFHM 14 and the UWB anchors 18. As such, the UWB anchors 18 do not require a secured connection with the RFHM 14, thereby reducing cost of the system and enabling anchors 18 to be placed in locations on the vehicle that were previously impractical (e.g., vehicle side mirrors) due to the secured connection requirement. As such, the described system only requires the UWB anchors 18 to have a power connection rather than both a power connection and secure data connection. In this way, in the example embodiment, the RFHM and/or vehicle controller 20 (e.g., BCM) are in electrical communication with each of the UWB anchors 18 to provide power thereto. This also advantageously enables the RFHM 14 and/or controller 20 to directly control a power reset of the UWB anchors 18 in the event of a malfunction or technical issue.

In some examples, system 10 operates with a LF operating frequency range between 30 KHz and 300 kHz, a UWB operating frequency range between 3.1 GHz and 10.6 GHz, and a UHF operating frequency range between X-X 300 MHz and 3 GHz.

Figure 2:
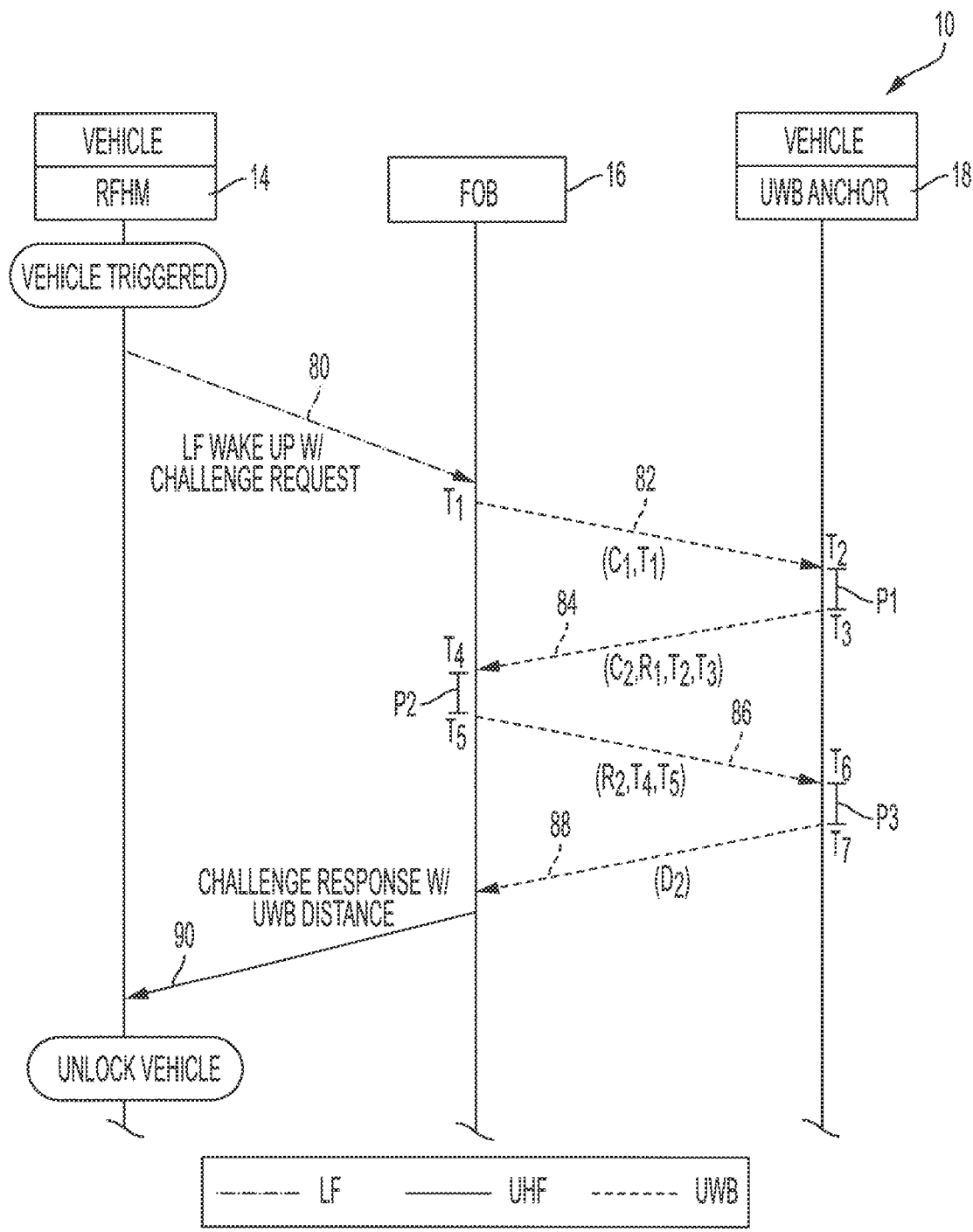
FIG. 2 is a schematic diagram of an example operation of the vehicle passive entry system shown in FIG. 1, according to the principles of the present disclosure.
Figure 3:
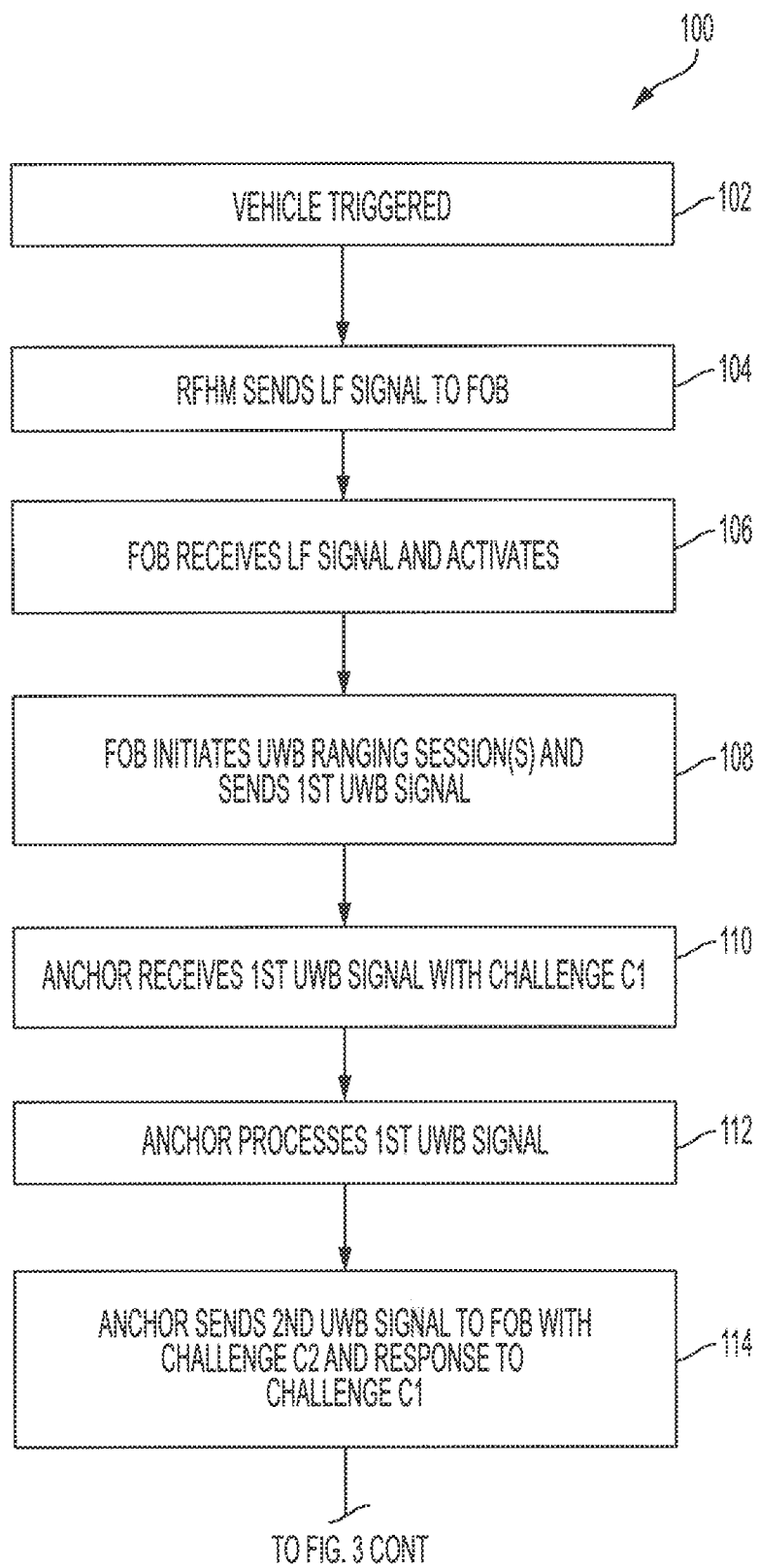
FIG. 3 is schematic diagram of an example method of operating the vehicle passive entry system shown in FIG. 1, according to the principles of the present disclosure.
Figure 3:
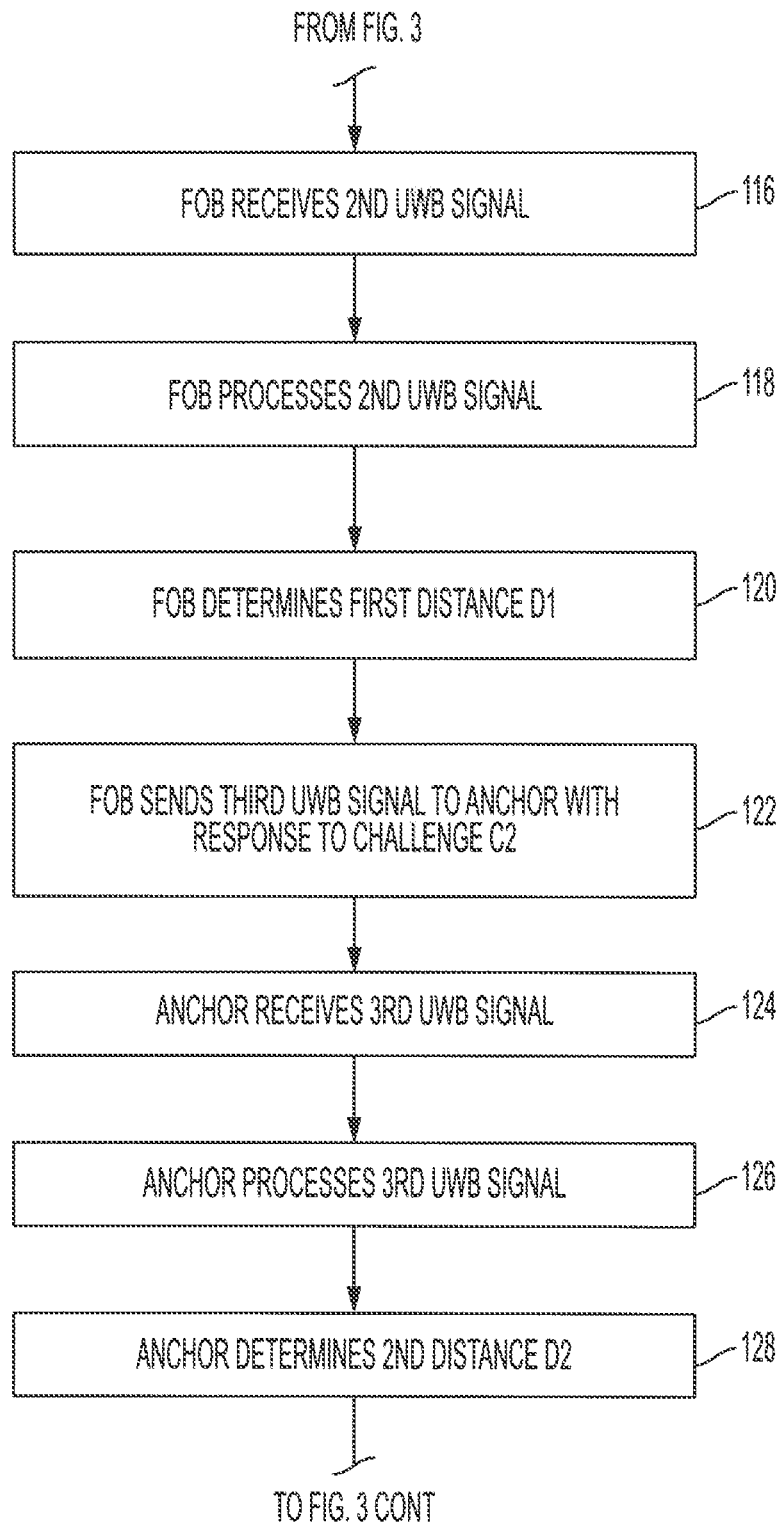
Figure 3:
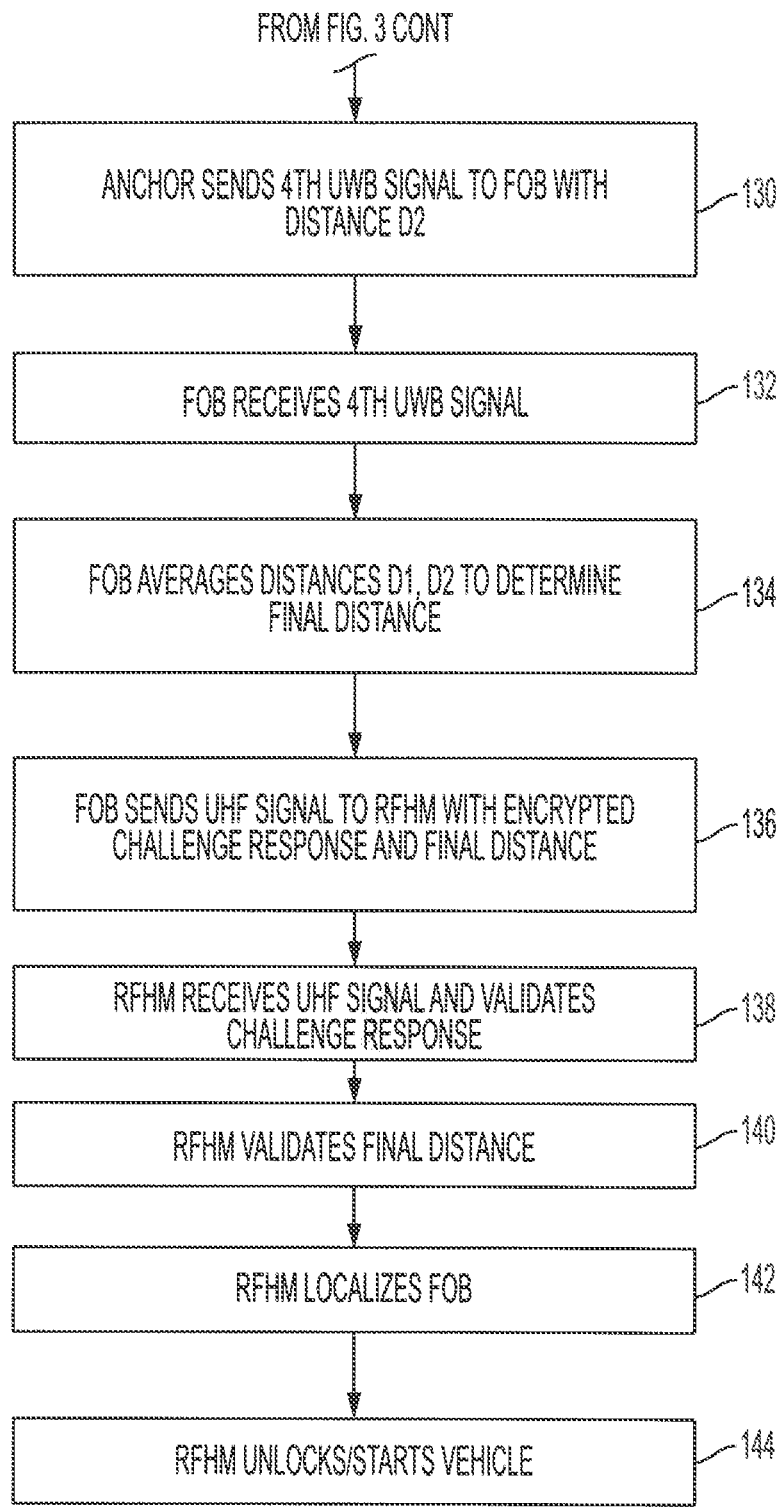

With additional reference to FIGS. 2 and 3, an example method 100 of operating passive entry system 10 to unlock or start vehicle 12 will now be described. The method begins at step 102 where the vehicle is triggered by a user actuating (e.g., touching or pulling) the door handle 28 or pushing the vehicle start button 30. At step 104, RFHM 14 generates a LF signal 80 (FIG. 2) and transmits the LF signal 80 from the LF antennas 32 to the fob 16. In the example embodiment, the LF signal 80 includes both a LF wake-up message and an encrypted challenge request and SSID using designated secret keys. In some examples, the encrypted challenge request is an unpredictable preamble that is a designated secret key to an encryption formula, and a response is the answer to the formula using the same key.

At step 106, the fob 16 receives the LF signal 80 and becomes activated. At step 108 the fob 16 begins a UWB ranging session and sends a first UWB signal 82 to the UWB anchors 18. As such, triggering the door/start button 28, 30 causes the RFHM 14 to send the LF wake-up message and encrypted challenge request to the fob 16, which triggers an UWB ranging session between the fob 16 and UWB anchors 18. Although described herein as one UWB anchor 18, it will be appreciated that the communications described herein can be to/from a plurality of UWB anchors 18.

The first UWB signal 82 includes a first UWB challenge C1 along with an associated timestamp T1. As illustrated in FIG. 2, fob 16 sends the first UWB challenge C1 at time T1. In the example embodiment, the challenge is a designated formula, number, etc. to trigger a response from the UWB anchor to provide time-of-flight and/or other information.

At step 110, UWB anchor 18 receives the first UWB signal 82 including the challenge C1 at time T2. At step 112, UWB anchor 18 processes the fob first UWB challenge C1. In the example illustration, the processing takes a processing time P1.

At step 114, the UWB anchor 18 then generates and sends a second UWB signal 84 to the fob at time T2. The second UWB signal 84 includes a second UWB challenge C2 along with an associated timestamp T3, as well as a response R1 to the first challenge C1, along with the timestamp T2 of when the associated challenge C1 was received by UWB anchor 18. As shown, UWB anchor 18 sends the second UWB challenge C1 at time T3. In the example embodiment, the first processing time P1 of challenge C1 at UWB anchor 18 is the difference between timestamp T3 and timestamp T2.

At step 116, the fob 16 receives the second UWB signal 84 at time T4. At step 118, the fob 16 processes the second UWB challenge C2. In the example embodiment, the processing takes a processing time P2. At step 120, the fob 16 determines a first UWB distance measurement D1 between the fob 16 and the UWB anchor 18. D1 is determined using the equation $$D1 = \frac{T4 - T1 - (T3 - T2)}{2} * c,$$

where 'c' is the speed of light.

At step 122, the fob 16 then generates and sends a third UWB signal 86 to the UWB anchor 18 at a time T5. The third UWB signal 86 includes a response R2 to the second challenge C2 along with the associated timestamp T5, as well as the timestamp T4 of when the associated challenge C2 was received. As shown, the fob 16 sends the second challenge response R2 at time T5. In the example embodiment, the second processing time P2 of challenge C2 at fob 16 is the difference between timestamp T5 and timestamp T4.

At step 124, the UWB anchor 18 receives the third UWB signal 86 at time T6. At step 126, the UWB anchor 18 processes the second challenge response R2 and timestamps T4, T5. In the example embodiment, the processing takes a processing time P3. At step 128, the UWB anchor 18 determines its own second UWB distance measurement D2 between the fob 16 and the UWB anchor 18. D2 is determined using the equation $$D2 = \frac{T6 - T3 - (T5 - T4)}{2} * c,$$

where 'c' is the speed of light. At step 130, the UWB anchor 18 generates and sends a fourth UWB signal 88 to the fob 16 at time T7. The fourth UWB signal 88 includes distance D2.

At step 132, the fob 16 receives the fourth UWB signal 88 including the distance D2 determined by the UWB anchor 18. At step 134, the fob 16 determines a final determined distance Df between the fob 16 and each individual UWB anchor 18 (if there is more than one) by averaging the determined distances D1, D2 for each UWB anchor 18 and ranging session. In the example embodiment, the fob 16 and anchor 18 exchange multiple UWB messaging sessions, and all of the distances D1, D2 determined during those sessions may be averaged. In some examples, distances determined to be inaccurate and/or outliers are discarded before determining the final distance Df.

At step 136, the fob 16 generates and sends a first UHF signal 90 to the RFHM 14. The first UHF signal 90 includes an encrypted challenge response using the designated secret keys, as well as the measurement report of the final determined distance Df between the fob 16 and UWB anchor(s) 18. Alternatively, the UHF signal 90 can include the determined distances D1, D2, and the RFHM 14 can determine the final distance Df between the fob 16 and anchor 18 by averaging the first and second determined distances D1, D2.

At step 138, the RFHM 14 receives the first UHF signal 90 and decrypts and validates the encrypted challenge response to confirm the portable fob 16 is authorized to control the requested function of the vehicle (e.g., unlock the door, start the vehicle). At step 140, the RFHM 14 validates an upper bound of the UWB final distance measurement against a predefined or predetermined distance 'D_U' for unlocking the vehicle 12, or predefined distance for starting the vehicle 12, to thereby confirm the portable fob 16 is within the predefined distance.

In some embodiments, if there are multiple final distance measurements corresponding to multiple UWB anchors 18, confirmation and validation of the fob distance may require only one of the final distance measurements Df to be within the predefined distance. For example, if the final distance Df for a first anchor 18 is within the predefined distance, and the final distance Df for a second anchor 18 exceeds the predefined distance, the RFHM 14 may still validate the fob 16 as being within the predefined distance.

At step 142, if the fob 16 is authenticated or recognized as belonging to the vehicle 12, the RFHM 14 localizes the fob 16 based on a LF measurement report of power level (e.g., RSSI level) received from the fob 16. At step 144, if the RFHM 14 determines the fob 16 is located within the predefined distance for the requested access ('D_U' for door unlock (e.g., 1.5 m), and 'D_S' for vehicle start (e.g., 2.0 m)), the RFHM 14 subsequently unlocks or starts the vehicle 12.

Accordingly, to increase accuracy and prevent relay attacks, system 10 advantageously conducts a double sided distance measurement to authenticate fob 16 with greater assurance. In operation, the fob 16 is triggered by a challenge request from the RFHM 14 and subsequently controls the communication with the RFHM 14 and UWB anchors 18. Because of the double sided distance measurement, the first distance measurement D1 relies on the processing time of the UWB anchors 18, while the distance measurement D2 relies on the processing time of the fob 16. Accordingly, since processing times may be affected temperature, and the distance measurements are affected by the processing times, the distance measurements are calculated twice with different processors. This helps alleviate the situation where an incorrect distance is calculated due to temperature (e.g., a cold car in snow and a warm fob in a house).

To further increase accuracy, the measurements may be performed multiple times (e.g., 5-10 UWB messaging sessions), and an average is taken of the determined distances D1, D2 from all sessions determine the final distance.

In addition, in some examples, one or more of the multiple UWB messaging sessions are performed at different frequencies from each other. By performing the measurements at different frequencies, inaccurate distance measurements can be identified and discarded, for example, if a certain frequency has high noise causing a jammed signal. Accordingly, the system performs multiple distance measurements to increase accuracy and the probability that the operation will determine the correct distance and properly authenticate the fob 16.

In one example of measuring at multiple frequencies, a first half of the UWB ranging session utilizes a first center frequency, and a second half of the ranging session utilizes a second center frequency. In the example embodiment, each center frequency has a unique electro-magnetic pattern, thus using multiple center frequency ranging to improve ranging reliability, which is useful if one of the center frequencies is jammed. As such, if one of the center frequencies appears to be unreliable, the RFHM 14 discards the unreliable center frequency measurement and bases the decision to unlock/start the vehicle 10 on the other center frequency.

Figure 4:
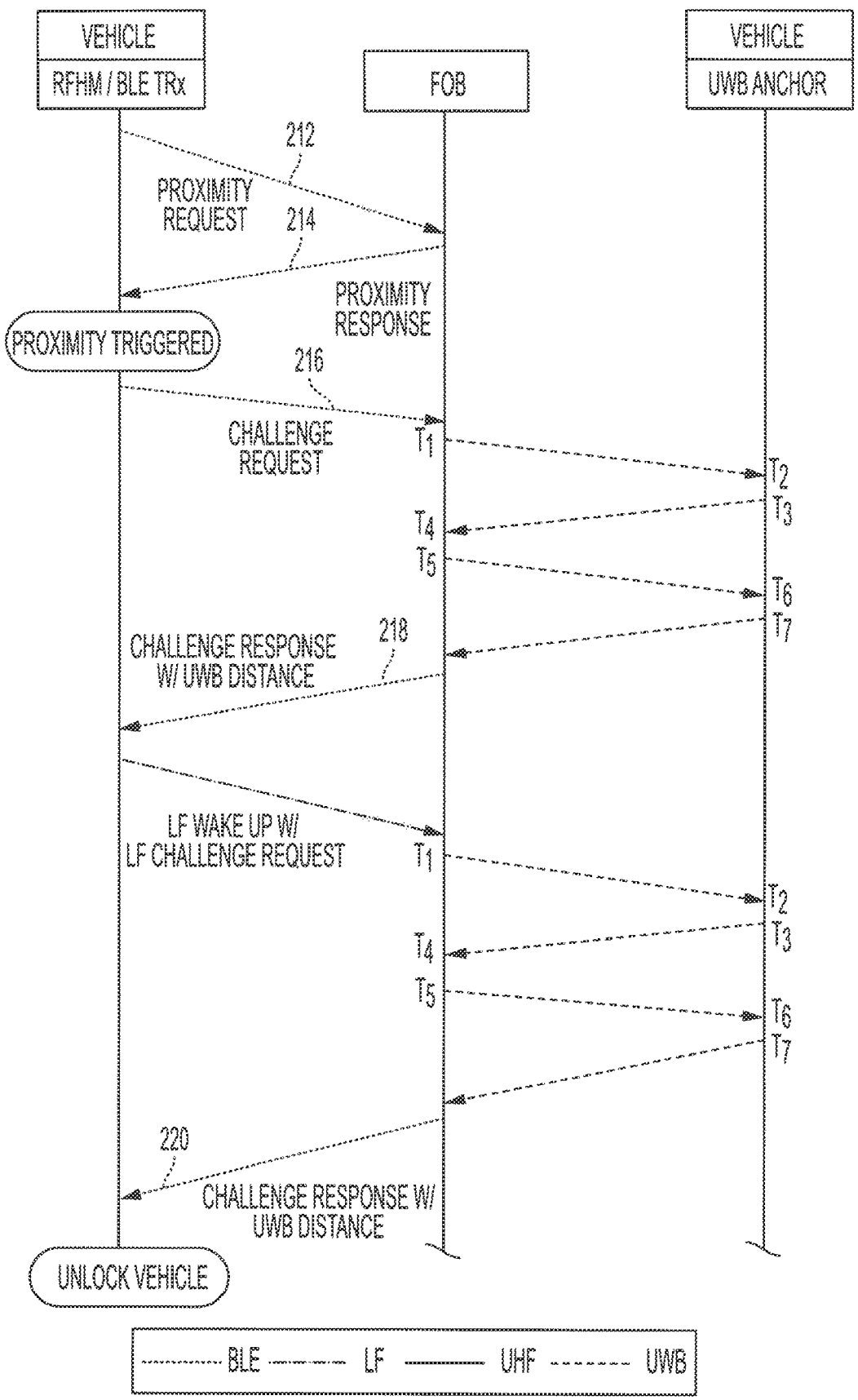
FIG. 4 is a schematic diagram of another example operation of the vehicle passive entry system shown in FIG. 1, according to the principles of the present disclosure.

With reference now to FIGS. 1 and 4, an alternative embodiment of triggering or initiating the double-sided UWB ranging session is provided. In the example embodiment, the UWB ranging session is triggered by a proximity detection of fob 16 rather than actuation of the door handle 28 or vehicle start button 30.

As shown in FIG. 1, to provide proximity detection, the RFHM 14 includes a transceiver 200 such as a Bluetooth transceiver. In one example, the transceiver 200 communicates using Basic Rate/Enhanced Data Rate (BR/EDR) and/or Bluetooth Low Energy (BLE) systems. The fob 16 similarly includes a transceiver 210 such as a Bluetooth transceiver.

With reference to FIG. 4, in an example operation, the RFHM 14 is configured to transmit a continuous signal 212 (e.g., Bluetooth/BLE signal) a predefined distance (e.g., five meters) via the transceiver 200 and/or LF antenna 32. When the fob 16 comes within the predefined distance and receives the signal, the fob 16 is activated and responds back to the vehicle with a Bluetooth signal 214 acknowledging its presence in the vehicle vicinity. At this point, the proximity is triggered and RFHM 14 generates and sends a Bluetooth signal 216 from the transceiver 200 (or antenna 32) to the fob 16. In the example embodiment, the signal 216 includes an encrypted challenge request and SSID using designated secret keys.

The fob 16 receives the signal 216 and begins an UWB ranging session (e.g., signals 82-88), as previously described herein. The fob 16 then generates and sends a Bluetooth signal 218 to the RFHM 14 that includes the encrypted challenge response using the designated secret keys, as well as the measurement report of the final determined distance Df between the fob 16 and the UWB anchor(s) 18. Alternatively, the Bluetooth signal 218 can include the determined distances D1, D2, and the RFHM 14 can determine the final distance Df between the fob 16 and anchor 18 by averaging the first and second determined distances D1, D2. With this information, the RFHM 14 determines if the fob 16 is within a predefined passive entry zone (e.g., within five meters).

If the RFHM 14 determines the fob 16 is within the predefined passive entry zone, the RFHM 14 generates the LF signal 80 and begins the UWB ranging session (e.g., FIG. 1, signals 82-88). The fob 16 then generates and sends a Bluetooth signal 220 to the RFHM 14 that includes the encrypted challenge response using the designated secret keys, as well as the measurement report of the final determined distance Df between the fob 16 and the UWB anchor(s) 18. The RFHM 14 then unlocks/starts the vehicle 12 if the fob 16 is authenticated or recognized as belonging to the vehicle 12 and is located within the predefined distance for the requested access. It will be appreciated that in some embodiments that LF ranging (e.g., distance measurement based on LF signals) can be limited to vehicle start trigger only, while vehicle unlock trigger can depend entirely on UWB ranging (e.g., distance measurement based on LF signals).

Described herein are systems and methods for preventing relay attacks against vehicle passive entry systems by authenticating a key fob based on distance determinations between the fob and the vehicle. Unlike conventional passive entry systems, the systems described herein utilize double sided (two cycle) UWB with distance bounding protocol as an added layer of security for fob ranging purposes. As such, both the fob and the anchor perform separate distance ranging measurements in order to mitigate the deviation of the crystal or oscillator frequency as compared to the absolute at 25° C.

In general operation, a LF signal is used to activate the fob, which sends a UWB signal to the anchors. The anchors and fob each process the UWB messages to confirm the key fob's distance, and the fob responds with a UHF signal. The UWB verifier's challenges are unpredictable to the prover, and the prover's replies are to be computed as a function of these challenges. The vehicle is then unlocked or started if the fob is determined to belong to the vehicle and the fob's distance to the vehicle is within a predetermined range. Accordingly, the systems described herein provide enhanced protocol for passive entry systems to prevent relay attacks and cicada-like attacks, improve UWB ranging reliability, mitigate temperature impacts on crystal accuracy, and eliminate the costs associated with adding a CAN network for the vehicle UWB anchors.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A passive entry system for a vehicle, the system comprising:
   a portable fob; and
   a communication and control unit disposed on the vehicle and including a radio frequency hub module (RFHM) and a UWB anchor, the communication and control unit configured to control a function of the vehicle,
   wherein the portable fob and the communication and control unit are configured to communicate ultra-wideband (UWB) signals therebetween, the UWB signals including authentication information to confirm the portable fob is authorized to control a function of the vehicle, and time-of-flight information to confirm the portable fob is within a predetermined distance of the vehicle,
   wherein when the function of the vehicle is triggered, the communication and control unit initiates a double-sided UWB ranging session with the portable fob where (i) the portable fob determines a first distance between the portable fob and the communication and control unit based on the time-of-flight information in the UWB signals, and (ii) the communication and control unit determines a second distance between the portable fob and the communication and control unit based on the time-of-flight information in the UWB signals,
   wherein the communication and control unit is configured to prevent control of the function of the vehicle if a final distance, determined from the first and second distances, is greater than the predetermined distance,
   wherein the first determined distance is a distance between the portable fob and the UWB anchor, and
   wherein the second determined distance is a distance between the portable fob and the UWB anchor, and
   wherein the system does not have a data connection between the RFHM and the UWB anchor.

2. The system of claim 1, wherein the UWB anchor is configured to determine the second distance.

3. The system of claim 1, wherein the RFHM is configured to send a low frequency (LF) wakeup signal and an encrypted challenge request to the portable fob when the function of the target device is triggered.

4. The system of claim 3, wherein the portable fob is configured to send a first UWB signal to the UWB anchor, the first UWB signal including a first UWB challenge and a first timestamp associated therewith.

5. The system of claim 4, wherein the UWB anchor is configured to process the first UWB signal and send a second UWB signal to the portable fob, the second UWB signal including:
   a second timestamp associated with when the UWB anchor received the first UWB challenge;
   a response to the first UWB challenge; and
   a second UWB challenge along with an associated third timestamp.

6. The system of claim 5, wherein the portable fob is configured to process the second UWB signal and send a third UWB signal to the UWB anchor, the third UWB signal including:
   a fourth timestamp associated with when the portable fob received the second UWB challenge;
   a response to the second UWB challenge; and
   a fifth timestamp associated with when the third UWB signal was sent.

7. The system of claim 6, wherein the UWB anchor is configured to process the third UWB signal and send a fourth UWB signal to the portable fob, the fourth UWB signal including the second determined distance.

8. The system of claim 1, wherein the RFHM is configured to send a Bluetooth or BLE wakeup signal and an encrypted challenge request to the portable fob when the function of the target device is triggered.

9. The system of claim 1, wherein the UWB anchor is in electrical communication with the RFHM such that the RFHM is configured to directly control a power reset of the UWB anchor.

10. The system of claim 1, wherein the UWB signals include a verification challenge that is unpredictable to the portable fob or UWB anchor receiving the UWB signals, the receiving portable fob or UWB anchor computing a reply as a function of the verification challenge.

11. A method of controlling a passive entry system having a portable fob and a communication and control unit, the communication and control unit disposed on a vehicle and configured to control a function of the vehicle, the method comprising:
   communicating ultra-wideband (UWB) signals between the portable fob and the communication and control unit, the UWB signals including authentication information to confirm the portable fob is authorized to control the function of the vehicle, and time-of-flight information to confirm the portable fob is within a predetermined distance of the vehicle;

when the function of the vehicle is triggered, initiating a double-sided UWB ranging session with the portable fob where (i) the portable fob determines a first distance between the portable fob and the communication and control unit based on the time-of-flight information in the UWB signals, and (ii) the communication and control unit determines a second distance between the portable fob and the communication and control unit based on the time-of-flight information in the UWB signals;

preventing control of the function of the vehicle if a final distance, determined from the first and second distances, is greater than the predetermined distance;

performing a first portion of the double-sided ranging session utilizing a first center frequency; and performing a second portion of the double-sided ranging session utilizing a second center frequency, the first and second center frequencies each having a unique electromagnetic pattern.

12. The method of claim 11, wherein the communication and control unit comprises a radio frequency hub module (RFHM) and a UWB anchor,
wherein determining the first distance comprises determining a first distance between the portable fob and the UWB anchor, and
wherein determining the second distance comprises determining a second distance between the portable fob and the UWB anchor.

13. The method of claim 12, wherein the UWB anchor determines the second distance.

14. The method of claim 13, further comprising sending, from the RFHM to the portable fob, a low frequency (LF) wakeup signal and an encrypted challenge request when the function of the vehicle is triggered.

15. The method of claim 14, further comprising sending, from the portable fob to the UWB anchor, a first UWB signal that includes a first UWB challenge and a first timestamp associated therewith.

16. The method of claim 15, further comprising:
processing, with the UWB anchor, the first UWB signal; and
sending a second UWB signal from the UWB anchor to the portable fob, the second UWB signal including:
a second timestamp associated with when the UWB anchor received the first UWB challenge;
a response to the first UWB challenge; and
a second UWB challenge along with an associated third timestamp.

17. The method of claim 16, further comprising:
processing, with the portable fob, the second UWB signal; and
sending a third UWB signal from the portable fob to the UWB anchor, the third UWB signal including:
a fourth timestamp associated with when the portable fob received the second UWB challenge;
a response to the second UWB challenge; and
a fifth timestamp associated with when the third UWB signal was sent.

18. The method of claim 17, further comprising:
processing, with the UWB anchor, the third UWB signal; and
sending a fourth UWB signal from the UWB anchor to the portable fob, the fourth UWB signal including the second determined distance.

19. The method of claim 18, further comprising sending an ultra-high frequency (UHF) signal from the portable fob to the RFHM, the UHF signal including the final distance, and
wherein the UHF signal further includes a response to the encrypted challenge request, and wherein the function of the vehicle is one of unlocking the vehicle and starting the vehicle.

20. The method of claim 11, wherein the first portion is a first half of the double-sided UWB ranging session, and the second portion is a second half of the double-sided UWB ranging session.

* * * * *